Oct. 25, 1949.   J. ABREY ET AL   2,486,367
PINEAPPLE CROWN TRIMMING MACHINE
Filed July 14, 1945   3 Sheets-Sheet 1
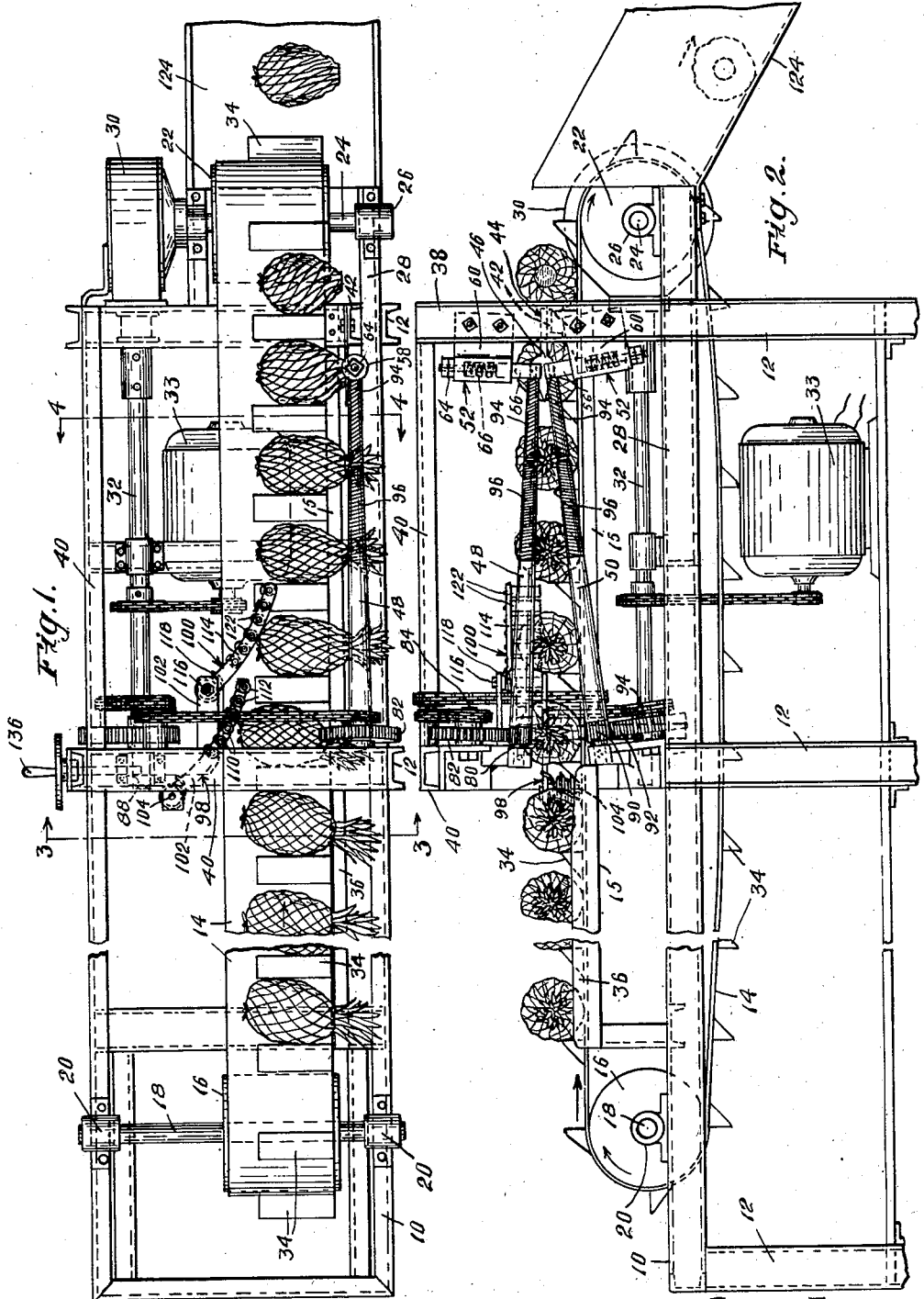
Inventors.
JOHN ABREY
JAMES TAIT MUNRO
JAMES THOMAS YOUD
Edgar H. Kent
Attorney.

Oct. 25, 1949.  J. ABREY ET AL  2,486,367
PINEAPPLE CROWN TRIMMING MACHINE

Filed July 14, 1945  3 Sheets-Sheet 2

Inventors.
JOHN ABREY
JAMES TAIT MUNRO
JAMES THOMAS YOUD
by Edgar H. Kent
Attorney.

Oct. 25, 1949.  J. ABREY ET AL  2,486,367
PINEAPPLE CROWN TRIMMING MACHINE
Filed July 14, 1945  3 Sheets-Sheet 3
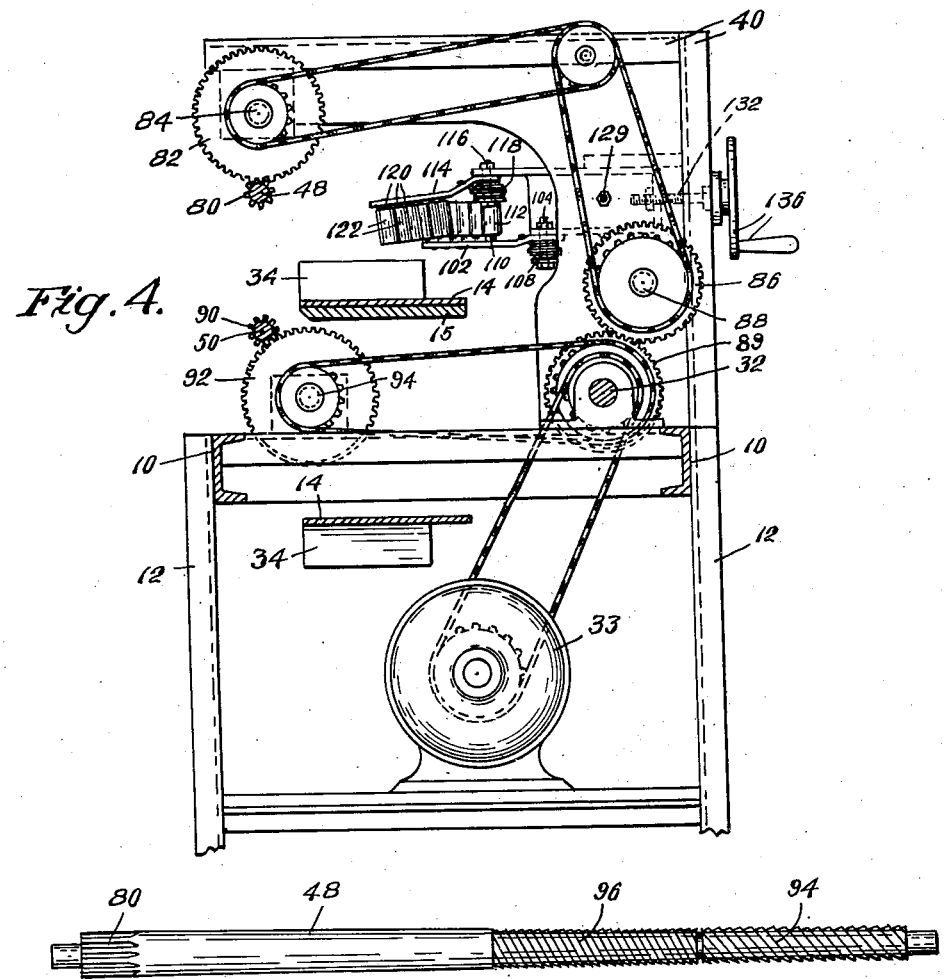
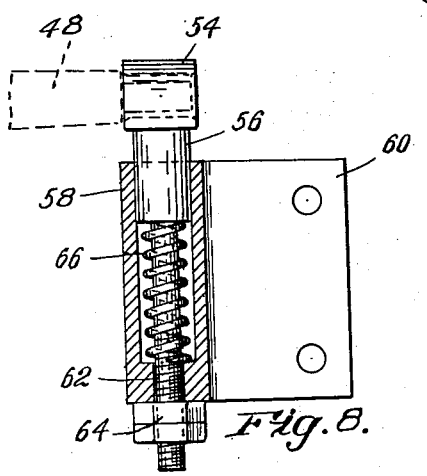
Inventors.
JOHN ABREY
JAMES TAIT MUNRO
JAMES THOMAS YOUD
by Edgar H. Kent
Attorney.

Patented Oct. 25, 1949

2,486,367

UNITED STATES PATENT OFFICE 2,486,367

PINEAPPLE CROWN TRIMMING MACHINE

John Abrey and James Tait Munro, Honolulu, and James Thomas Youd, Lanikai, Territory of Hawaii, assignors to Hawaiian Pineapple Company, Limited, Honolulu, Territory of Hawaii, a corporation of Hawaii Application July 14, 1945, Serial No. 605,064

10 Claims. (Cl. 146—6)

This invention relates to trimming machines for fruit and vegetables and particularly to such a machine adapted for the decrowning of pineapples.

Objects of the invention are to provide such a machine of novel construction which is capable of automatically removing the crowns of pineapples accurately, cleanly and uniformly despite differences in size and shape of the fruit and with a minimum loss of edible fruit, which is rapid and efficient in operation and which may be employed in the canning factory or as portable equipment for use in the field as harvesting apparatus. The foregoing and other objects and advantages of the invention will be apparent from the ensuing particular description and from the appended drawings, in which:

Fig. 1 is a plan view, partially broken away, of a pineapple decrowning machine of the present invention;

Fig. 2 is a side elevation view, also partially broken away, of the machine shown in Fig. 1;

Fig. 4 is a vertical section view on line 4—4 of Fig. 1, in the direction of the arrows;

Figs. 7 and 8 are, respectively, detail views of a crown feeding shaft and of an end mounting therefor.

Figure 3:
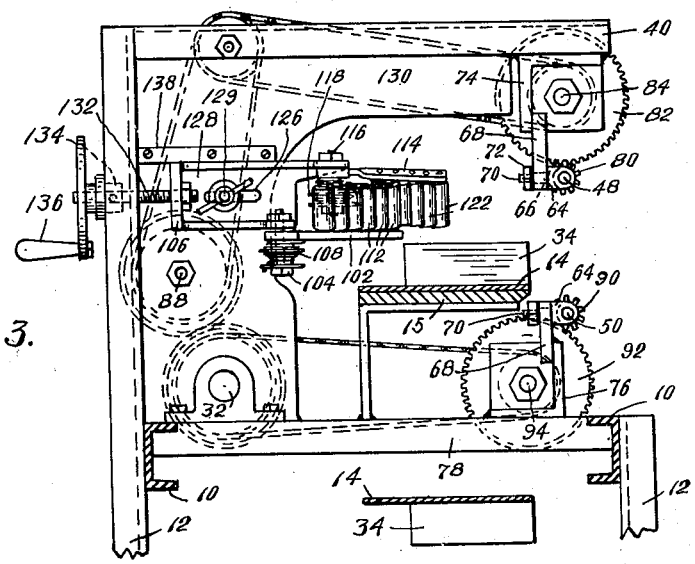
Fig. 3 is a vertical section view on line 3—3 of Fig. 1, in the direction of the arrows.

Referring to the accompanying drawings, which illustrate a preferred embodiment of the invention, the machine shown has a generally rectangular frame 10 horizontally supported on legs 12. Extending longitudinally of the frame is an endless conveyer belt 14, extending at the rear end of the frame over a drum 16 fixed to a shaft 18 idly rotatable in bearings 20 on the sides of the frame and, at the front end of the frame, over a driving drum 22 fixed to a shaft 24 rotatably received at one end in a bearing 26 on a front extension 28 of the frame, and rotatably connected at the other end through a reduction speed gearing indicated at 30 to a drive shaft 32. Shaft 24 is rotated in the clockwise direction as viewed in Figs. 1 and 2, so that the upper stretch of the belt moves from rear to front of the frame, as indicated by the arrows in these figures, by a motor 33 having sprocket gear and chain connection with the shaft. The upper stretch of the belt rests on a platform 15 mounted on the frame.

Belt 14 is provided on its outer surface with a series of longitudinally spaced cleats 34 extending transversely of the belt, each cleat forming a rest or carrier for a pineapple placed on the belt. The pineapples are fed onto the belt at the rearward end of the frame between successive cleats with the body of the fruit resting on the belt and against the succeeding cleat and the crown projecting from one side of the belt, as indicated in the drawings. The crowns rest and slide upon a smooth rail 36 attached to the side of platform 15, which rail supports the crowns as the pineapples are carried forwardly by the belt to a trimming or decrowning mechanism located at the forward end of the frame and operating to sever the crowns from the fruit, as will now be described.

Figure 5:
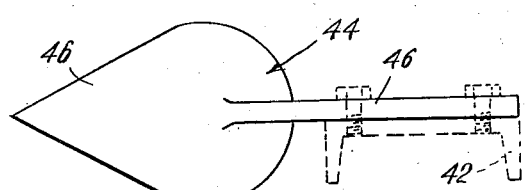
Fig. 5 is a detail view of the decrowning knife.

Fixed to the frame 10 near its forward end and at the side of the belt from which the pineapple crowns project is an upright 38 (Fig. 2) forming one supporting leg of a three-legged frame 40 which overhangs the path of travel of the conveyer belt, the other two legs of frame 40 being attached to the opposite side of frame 10. Mounted on an inwardly projecting bracket 42 on upright 38 is the decrowning knife 44 which, as shown, is of the stationary type having a pointed, spear-shaped blade 46 disposed in a vertical plane and extending rearwardly from bracket 42 in the path of the crowns of the pineapples advancing on the conveyer. As particularly shown in Fig. 5, knife 44 is provided with an integral web or handle portion 46 projecting from its outer face by which it is bolted or otherwise fastened to bracket 42.

Immediately adjacent the outer surface of knife blade 46 are supported the forward ends of a pair of cooperating crown controlling and feeding shafts, an upper shaft 48 and a lower shaft 50. These shafts extend longitudinally of the conveyer, in the same vertical plane but oppositely inclined to the horizontal so that they closely approach each other at their forward ends and are relatively widely separated at their rearward ends. The shafts are shown as of gradually diminishing diameter, that is, slightly tapered, from their rearward to their forward ends. The forward ends of the shafts 48, 50 are rotatably mounted on supports 52 attached to upright 38, these supports being yieldable to permit separation of the shaft ends. Supports 52, shown in Figs. 2 and 8, comprise a bearing sleeve 54 within which is rotatably held the forward end of the shaft, sleeve 54 being integral with a tube 56 which is slidable in one end of a socket 58 having a flange 60 by which it is fastened to upright 38 with its axis substantially normal to the axis of the shaft. A guide pin 62, threaded through the opposite end of socket 58 and held by a lock nut 64, extends longitudinally of the socket and is loosely received within the end of tube 56 so that the tube slides longitudinally of the pin and socket. A coil spring 66, surrounding pin 62 and bearing at opposite ends against tube 56 and the end of socket 58, urges tube 56 to an outer position with respect to the tube and pin 62 and yieldably opposes inward sliding of the tube.

The rearward ends of shafts 48, 50 are rotatably mounted in pivotal supports comprising bearing sleeves 64 (Fig. 3) each provided with a cylindrical extension 66 extending through an aperture in a supporting member 68, the extension 66 terminating in a reduced threaded shank portion 70 on which is threaded a retaining nut 72. The portion of extension 66 of larger diameter is of slightly greater length than the thickness of member 68 so that a looseness is provided when nut 72 is threaded to the inner limit of shank portion 70, permitting pivotal movement of the support with respect to member 68. Support member 68 for the upper shaft 48 is fixed to depend vertically from a bracket 74 attached to overhanging frame 40 while the other member 68 is fixed to a bracket 76 attached to a crossbar 78 of frame 10.

The rearward end mountings for shafts 48, 50 thus provide an unobstructed space between the shafts laterally aligned with the conveyer into and along which the pineapple crowns pass as the pineapples are carried by the conveyer to the front end of the machine. These mountings space the rearward ends of the shafts a substantially greater distance apart than their forward ends, the shafts being, as previously stated, oppositely inclined to the horizontal from front to rear. Thus, the gap between the shafts along which the crowns pass is substantially triangular in shape with its apex at the front. The spacing between the shafts, at their rearward ends, is amply large to permit the largest crowns to enter freely between the shafts, while at their forward ends the shafts are yieldably supported at a narrower spacing which is less than the thickness of the smallest crowns.

Thus as the crowns are advanced between the shafts, they are gradually brought to a tight fitting engagement with the shafts until the forward ends of the shafts are spread apart by the pressure of the crowns, as permitted by the yieldable supports 52 for the forward ends of the shafts and the pivotal mountings for their rearward ends. The shafts are therefore in controlling, pressure engagement with the crowns in advance of and at the point of engagement of knife 44 therewith as is requisite to the crown controlling operation of these shafts hereinafter described.

Referring particularly to Fig. 2, it will be seen that each of the shafts 48, 50 is provided toward its forward end with a spiral or worm thread or groove, the direction of the thread being opposite in the two shafts. To effect a positive feeding of the crowns by means of these co-operating worm threads, the shafts are continuously rotated in opposite directions. The drive connections for the upper shaft 48 (Figs. 3 and 4) comprise a gear 80 formed on the rearward end of the shaft meshing with a gear 82 rotatable on a stub shaft 84 mounted on the overhanging frame 40. Gear 82 is rotated by sprocket wheel and chain connections to a gear 86 rotatable on a stub shaft 88 fixed to frame 40, which gear 86 meshes with a drive gear 89 on drive shaft 32. Similarly, shaft 50 is continuously rotated by means of a gear 90 formed on its rearward end and meshing with gear 92 rotatable on stub shaft 94 fixed to frame 10, gear 92 being driven by sprocket wheel and chain connection direct to drive shaft 32. As will be apparent from Fig. 4, the connections are such that the shafts are driven oppositely, in the direction of their respective worm threads, at the same speed.

The depth of intermesh of the teeth of gears 80, 82 and 90, 92 is such that the gears remain in mesh despite pivotal movements of the shafts about the pivots of their rear end mountings due to spreading of their front ends by the crowns.

The rate of rotation of feed shafts 48 and 50 is co-ordinated with the speed of the conveyer and the pitch or lead of the thread on the shafts so that the rate of feed of the pineapple crowns by the shafts is at least approximately equal to the rate of feed of the pineapple itself by the conveyer. Preferably, however, the correlation is such that the crowns are fed forwardly by the shafts into contact with the knife at a slightly faster rate than the conveyer feed of the fruit body, as will hereinafter be explained.

Referring to Figs. 2 and 7, it will be seen that the threading of the shafts 48 and 50 is divided into two sections of different pitch, a front end section 94 having the greater pitch and a preceding section 96. The lead of the screw thread 94 is such that, at the predetermined operating speed of the shaft relative to the conveyer, it will feed the crowns forwardly at a slightly faster rate than the rate of advance of the pineapple bodies on the conveyer. It extends from the front end of the shaft, which is adjacent the knife, rearwardly no further than a point at which the smallest crowns likely to be encountered will be firmly clamped between the shafts and therefore will be in feeding engagement with thread 94 throughout its length.

The pitch of screw thread 96 is such that, at the operating speed, it will advance the crowns at a rate approximately equal to the rate of advance of the conveyer. It extends rearwardly from thread 94 at least as far as the point at which the largest crowns likely to be encountered will be under substantial pressure between the shafts. As shown, thread 96 extends only part way from the rear end of thread 94 to the rear end of the shafts, the remaining length of the shafts being smooth surfaced.

Co-operating with the shafts 48, 50 are pineapple positioning and straightening means which comprise, as shown, two pressure members 98, 100 (Figs. 1 to 4) arranged on the opposite side of the conveyer from shafts 48, 50 for successive engagement with the butt ends of the pineapples advancing on the conveyer. The rearmost of the two members, member 98, comprises a curved arm 102 pivotally mounted at its rearward end on a pivot pin 104 fixedly attached to a rearward extension of the lower arm of a vertically disposed U-shaped supporting bracket 106 attached to overhanging frame 40. A coil spring 108 surrounding pin 104 and attached at opposite ends to arm 102 and bracket 106 urges arm 102 to an idle position in which it extends forwardly and laterally from its pivot and over the conveyor. Rising from the arm 102 are a plurality of shafts 110 each rotatably mounting a contact roller 112.

The other or front positioning member 100 is similar in construction to the member 98 comprising a curved arm 114 pivotally mounted on a pivot pin 116 fixed to a forward extension of the upper arm of bracket 106. A coil spring 118 surrounding pin 116 and secured at its opposite ends to the arm and bracket urges the arm 114 to an idle position in which it extends forwardly and laterally from its pivot point somewhat further over the conveyer than the member 98. Arm 114 is provided with a plurality of shafts 120 each rotatably mounting a contact roller 122, the shafts in this case depending from the arm. Member 100 is located immediately to the rear of threaded section 96 of shafts 48, 50 and member 98 is located immediately to the rear of member 100.

The conjoint action of the conveyer, crown feed shafts and positioning means to position and feed the fruit automatically and uniformly to the decrowning knife is as follows. The pineapple body, while substantially cylindrical from its butt end for a substantial part of its length, tapers near the crown, the extent and length of the taper differing somewhat with different fruit. As the pineapples are carried forwardly by the conveyer from the feeding station at the rear of the machine, some tend to assume a position against the cleats 34 with the crown end tilted somewhat rearwardly of the butt end, as indicated in Fig. 1. This is because the weight and drag of the crowns tends to tip the crown ends rearwardly on the shoulder of the tapering crown end of the fruit, lifting the cylindrical body portion away from the cleat, in the case of those fruit having a relatively long taper and short cylindrical portion.

As each successive pineapple reaches the shafts 48, 50 and its crown enters between the widely spaced rearward ends of the shafts, the front side of the butt end of the fruit engages the contact rollers of rear positioning member 98. Due to the resistance of spring 108 to outward pivoting of the member, the rollers exert a pressure against the front side of the butt end toward the opposite side of the crown end of the fruit. As a result, the butt end of the cylindrical body portion of any fruit which is tilted rearwardly on the crown end taper is forced toward the cleat 34 bringing the lagging crown end forwardly so that the fruit is positioned with its longitudinal axis substantially normal to the direction of travel of the conveyer. As a further result, the pineapple is, or may be, pushed endwise on the conveyer toward the shafts 48, 50 which are located a short distance to the outside of the plane of guide rail 36 on which the crowns rest during the initial travel, said rail terminating short of the shafts and fruit contacting position of member 98, as shown in Fig. 2.

As the pineapple advances beyond member 98, the front side of its butt end contacts the rollers of positioning member 100 which acts in the same manner as member 98 applying straightening and pushing pressure to the fruit. Member 100 is so positioned as to insure that the pineapple is pushed endwise sufficiently to force the crown end of the fruit body against the inner periphery of the shafts 49, 50. By reason of the yieldable spring mountings of the positioning members and free rotatability of their fruit contacting rollers, damage to the fruit by reason of the positioning pressure of the members on the fruit is avoided. As indicated in Fig. 1, the roller arms and shafts of the members 98, 100 are so positioned that the axes of the rollers incline outwardly of the conveyer from top to bottom, so that the pressure applied by the rollers is at a downward angle, avoiding any tendency to lift the pineapples from the conveyer.

During the straightening and positioning action of members 98, 100 on the fruit, their crowns are located between the widely spaced, smooth surfaced rear ends of shafts 48, 50 and the said action of these members is therefore unimpeded by frictional drag of the shafts on the crowns. However, by the time a fruit passes beyond the pressure engagement of member 100, its crown is firmly gripped between the co-operating worm threads 96 of the shafts. As these threads are so pitched as to advance the crowns at the speed of the conveyer, the pineapple is maintained thereby in its straightened position produced by the action of members 98, 100, throughout the length of threads 96. Furthermore, the pineapples are uniformly positioned with the crown end of the fruit in approximate contact with the shafts, and this position is maintained by the rotational action of the shafts which tends to feed the crown outwardly between the shafts and therefore to draw the crown ends of the fruit against their inner periphery.

From the foregoing it will be clear that, if the threads 96 were continued at uniform lead to the front ends of the shafts, the fruit would reach the decrowning knife and be subjected to its action while firmly held substantially uniformly in a position with their longitudinal axes at approximately a right angle to the direction of travel of the conveyer. We prefer, however, to provide the second thread 94, of greater pitch than the thread 96, on the front end portion of the shafts adjacent the knife, because, with the preferred type of cutter shown, we are able thereby to obtain a superior decrowning action, as will now be described.

Figure 6:
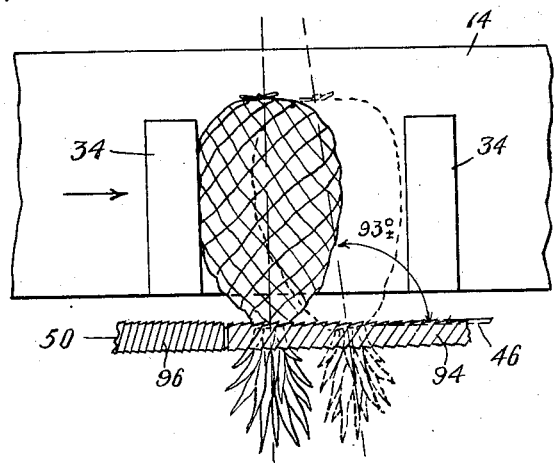
Fig. 6 is a detail view illustrating a preferred construction and operation of the decrowning mechanism.

As each pineapple advances from the front end of thread 96 to the rear end of thread 94, it will be, as previously described and shown in Fig. 6, positioned with its longitudinal axis approximately normal to the direction of travel of the conveyer. However, the threads 94, being of greater pitch than threads 96, will act to advance the crown end of the fruit slightly faster than the butt end with the result that the crown end is tipped slightly forward of the butt end at the moment of contact with the knife, as indicated by dotted lines in Fig. 6. This means that the longitudinal axis of the fruit is then at an angle greater than 90° to the knife which is disposed parallel to the direction of travel of the conveyer, an angle which may be in the neighborhood of 93° as indicated in Fig. 6. The knife is so positioned that its point meets the so-tipped fruit approximately exactly at the base of the crown. By reason of the angular position of the fruit which increases as the fruit advances past the knife, the knife does not cut the crown along the plane of its base but undercuts the crown along a plane which slants toward the butt end of the fruit from the front to the rear side of the fruit, so that the knife point emerges from the fruit at a point slightly below the base of the crown. The sharpened side edges of the point cut laterally under the crown in substantially the same plane. This undercutting of the crown is desirable since it insures complete, clean removal of the crown, and this, due to the small size of the knife, which is of only slightly greater width than the diameter of the crown base, is accomplished without removal of edible fruit from the crown end.

Furthermore, referring again to Fig. 6, the knife edge is beveled on the face toward the fruit. The continued forward tilting of the crown end of the fruit during its contact with the knife causes the front, severed portion of the crown base to move or tilt away from the knife progressively sufficiently to clear the thickened part of the bevel and correspondingly away from the severed portion of the crown which advances parallel to the conveyer along the flat outer surface of the knife. As a consequence, the knife is not required to press or displace the fruit away from its beveled face during the cutting and a cleaner cut is therefore obtained with less cutting pressure required.

Another advantage of the increased lead thread 94 is that it insures that any crown which is not fully straightened from a lagging position by the action of the positioning means will be advanced at least approximately to a right angle to the direction of travel, which is better for cutting than a lagging position.

After the crowns have been completely severed from the fruit they are deflected outwardly from between the front ends of the shafts 48, 50 by the knife and the rotary motion of the shafts, dropping clear of the shafts to a suitable collecting hopper or conveyer (not shown). The decrowned fruit continues to advance on the conveyer over the front drum 22, rolling off, as the conveyer passes downwardly over the drum, onto a receiving chute 124 attached to frame extension 28, this chute feeding the pineapples to a collecting bin, truck or conveyer (not shown) as may be desired.

Shafts 48, 50 are preferably of relatively small diameter, approximately 1 inch at the smaller front end and 1½ inches at the rear end being suitable in the pineapple decrowning machine shown. Further, in said machine, the threads 94, 96 may be suitably formed by cutting spiral grooves in the shaft having a substantially vertical rear face and a slanting forward face, as indicated in Figs. 6 and 7, the grooves being about ¼ inch wide at the top, thread 96 having aboute a 1¼ inch lead and thread 94 about a 1½ inch lead, and knife 44 may be located with its point between a vertical plane tangent to the shafts 48, 50 on the side facing the fruit and the vertical plane of their axes, about ⅜ inch inside the former plane, which position corresponds approximately exactly with the location of the front side of the crown base at the moment of contact with the knife.

To permit of lateral adjustment of the positioning members 98, 100, their supporting bracket 106 is slidably connected to frame 40 by means of a longitudinal slot 126 in a side plate 128 of the bracket (Fig. 3) slidable on a bolt 129 projecting rearwardly from a vertical plate 130 attached to frame 40, the bracket being releasably clamped against the plate by a wing nut on the rearward end of the bolt. Adjustment is effected by a threaded shaft 132 fixed at one end to the outer end of the bracket and extending through a threaded socket 134 in one of the legs of frame 40, an operating handle 136 being provided on the outer end of the shaft. A ledge 138 on plate 130 slidably engages the upper arm of bracket 106 to guide it during adjustment.

The pineapples may be automatically placed on the conveyer belt at the rear end of the machine, by means of a co-operating feeding conveyer or the like, or they may be placed thereon by hand. An important advantage of this machine is that the highly accurate and uniform decrowning action of which it is capable is not dependent upon accuracy of placement of the pineapples on the conveyer, the positioning members and crown feed shafts being capable of automatically adjusting the fruit to uniform cutting position despite variations in the initial positioning of the pineapples on the conveyer. Thus hand feeding of the machine does not require skilled labor and can be performed with great rapidity.

A stationary pointed decrowning knife of the type shown is preferred to a rotary cutter because it is simpler, involving less mechanism, it exerts less backward cutting pressure on the fruit and it can be combined with the preferred accelerated feed by the crown feed shafts to effect a desirable clean undercutting of the crowns as described above. However, a rotary cutter may be substituted if desired, in which case a single thread of uniform lead will normally be employed on the crown feed shafts so that the fruit are fed to the knife with their longitudinal axes normal to the plane of the knife, since the undercutting produced by tipping is, with a rotary knife, likely to produce excessive damage to the fruit at the crown end.

The machine may be mounted on a stationary base for use in the factory or receiving station or on a truck, tractor or other mobile base for use in the field during harvesting. In the latter case, the motor 33 of the machine may be dispensed with and the drive shaft of the machine connected to the propelling motor of the mobile base.

It will be understood that the detail of form of the apparatus and its elements herein shown is preferred only and may be departed from within the scope of the invention and that while apparatus according to the invention is particularly suited for the decrowning of pineapples, it may also be employed for trimming the leafy or other outgrowth of other fruits and vegetables of a similar nature.

Having now described a preferred embodiment of our invention, what we desire to claim and secure by Letters Patent is:

1. Apparatus for trimming an outgrowth such as the crown from the body of a pineapple or the like which includes a conveyer for supporting and advancing said body with said outgrowth at one side of the conveyer, feed means arranged at said side of the conveyer to grip said outgrowth and feed it forwardly in the direction of advance of the conveyer at a rate timed to the rate of advance of the conveyer, and cutter means interposed between said conveyer and said feed means for severing said outgrowth from said body, said feed means comprising a pair of co-operating rotary feed shafts arranged to extend longitudinally of said conveyer at opposite sides of the path of travel of said outgrowth to receive said outgrowth between them, co-operating worm threads on said shafts for gripping and feeding said outgrowth, and means mounting said shafts to converge from their rearward toward their forward end portions, said last named means including resilient supports for the forward ends of said shafts yieldable to permit spreading apart of said shaft ends and pivot mountings for the rearward ends of said shafts on which said shafts are pivotal in the direction of spreading movement of their forward ends.

2. Apparatus as claimed in claim 1 which includes means located adjacent the rearward ends of said shafts for thrusting said body transversely of the conveyer toward said shafts.

3. Apparatus as claimed in claim 1 wherein said co-operating worm threads have a forward section extending from a point rearwardly of said cutter means to a point adjacent said cutter means of greater pitch than a rearward section of said threads.

4. A pineapple decrowning machine comprising a conveyer for supporting and advancing the pineapples with the crown ends at one side of the conveyer, cutter means arranged at said side of the conveyer for severing the crowns from the pineapple bodies carried by said conveyer, and crown feed means arranged at said side of the conveyer to grip said crowns and feed them forwardly to said cutter means at a rate timed to the rate of advance of the conveyer comprising a pair of rotary feed shafts extending longitudinally of the conveyer at opposite sides of the path of travel of the crowns and arranged to receive the crowns between them, said shafts converging from their rearward toward their forward ends and being resiliently supported at their forward ends and pivotally mounted at their rearward ends to permit spreading apart of the forward ends of the shafts and co-operating worm threads on said shafts for gripping and feeding said crowns, the spacing between the rearward and forward ends of the shafts being such that the crowns are under gripping pressure between said threads thereof commencing at a point intermediate the ends of the shafts in advance of said cutter means.

5. A machine as claimed in claim 4 which includes means for engaging the butt ends of the pineapples on the conveyer while opposite the rear end portions of said shafts and rearwardly of a position of gripping pressure of said threads on their crowns to thrust the pineapples transversely of the conveyer toward said shafts to a position with the base of the crown disposed between the shafts.

6. A machine as claimed in claim 4 wherein said worm threads have a forward section extending from a point rearwardly of said cutter means to a point adjacent said cutter means of greater pitch than the preceding section of said threads, and which includes means for positioning the pineapples on the conveyer with their longitudinal axes at a substantially uniform angle to the direction of travel of the conveyer preliminary to gripping engagement of said preceding section of said threads with their crowns.

7. A pineapple decrowning machine comprising a conveyer for supporting and advancing the pineapple with the crown ends at one side of the conveyer, crown feed means at said side of the conveyer comprising a pair of rotary feed shafts arranged longitudinally of the conveyer at opposite sides of the path of the crowns to receive the crowns between them, said shafts converging toward their forward ends and being provided with worm threads co-operating to grip and feed the crowns forwardly, said worm threads being of increased pitch toward the forward ends of said shafts, means for rotating said shafts at a speed such that the rearward portion of said threads advances the crowns at a speed substantially equal to the rate of advance of the conveyer, cutter means interposed between the forward portion of said shafts and said conveyer for severing the crowns from the pineapple bodies, and positioning means acting on the pineapples on the conveyer preliminary to gripping engagement of said worm threads with their crowns to position the fruit with their longitudinal axes at substantially a uniform angle to the direction of travel of the conveyer and with their crown ends at a substantially uniform distance from the axes of said shafts.

8. A machine as claimed in claim 7 wherein said conveyer includes support members extending transversely thereof and engaging the rear side of the pineapples carried on the conveyer and said positioning means includes a resilient positioning member projecting into the path of the fruit and engaging the front side of the butt end thereof to thrust the fruit transversely of the conveyer while maintaining the butt ends of the fruit under pressure toward the said support member.

9. A machine as claimed in claim 7 wherein said cutter means is a knife having a pointed spear-shaped blade disposed in a plane substantially normal to the plane of the conveyer and having its point directed rearwardly in alignment with the crown bases of the pineapples advanced thereto by said conveyer and crown feed shafts.

10. Apparatus for trimming an outgrowth such as the crown leaves from the body of a pineapple or the like which includes a conveyer for supporting and advancing said body with said outgrowth at one side of the conveyer, said conveyer including a support member for engaging the rear side of said body carried thereon, feed means arranged at said side of said conveyer to grip said outgrowth and feed it in the direction of advance of the conveyer at a rate timed to the rate of advance of said body by said conveyer, cutter means interposed between said conveyer and said feed means for severing said outgrowth from said body, and resilient positioning means arranged to engage the body only at the front side of the butt end portion opposite said outgrowth preliminary to gripping of said outgrowth by said feed means to thrust said body transversely of the conveyer toward said feed means while pressing the butt end only of the body toward said support member, said positioning means including an arm pivoted about an axis at the side of said conveyer opposite said feed means and substantially normal to the plane of said conveyer, said arm extending forwardly and laterally from its pivot to a point over the conveyer and carrying a plurality of rollers projecting therefrom at an angle to the plane of the conveyer for rolling contact with said end portion of said body, and resilient means yieldably opposing pivotal movement of said arm in a direction away from said conveyer.

JOHN ABREY.
JAMES TAIT MUNRO.
JAMES THOMAS YOUD.

REFERENCES CITED

The following references are of record in the file of this patent:

UNITED STATES PATENTS

| Number | Name | Date |
|---|---|---|
| 1,281,082 | Sells | Oct. 8, 1918 |
| 1,312,361 | Sells | Aug. 5, 1919 |
| 1,763,173 | Morral | June 10, 1930 |
| 2,031,277 | Morral | Feb. 18, 1936 |
| 2,289,015 | Jackson | July 7, 1942 |
| 2,319,559 | Savage | May 18, 1943 |